(12) United States Patent
Fuhrmann et al.

(10) Patent No.: US 8,315,782 B2
(45) Date of Patent: Nov. 20, 2012

(54) METHOD AND DEVICE FOR OPERATING AN INTERNAL COMBUSTION ENGINE

(75) Inventors: Nicole Fuhrmann, Lappersdorf (DE); Stefan Seyfferth, Regensburg (DE)

(73) Assignee: Contitnental Automotive GmbH, Hannover (DE)

( * ) Notice: Subject to any disclaimer, the term of this patent is extended or adjusted under 35 U.S.C. 154(b) by 65 days.

(21) Appl. No.: 12/994,315

(22) PCT Filed: Apr. 17, 2009

(86) PCT No.: PCT/EP2009/054582
§ 371 (c)(1),
(2), (4) Date: Nov. 29, 2010

(87) PCT Pub. No.: WO2009/144092
PCT Pub. Date: Dec. 3, 2009

(65) Prior Publication Data
US 2011/0083652 A1  Apr. 14, 2011

(30) Foreign Application Priority Data
May 29, 2008  (DE) .......................... 10 2008 025 676

(51) Int. Cl.
*F02D 41/24* (2006.01)
(52) U.S. Cl. ......... 701/109; 123/674; 123/691; 123/699
(58) Field of Classification Search .................. 701/109; 123/672, 691, 699, 674; 60/276, 285, 299
See application file for complete search history.

(56) References Cited

U.S. PATENT DOCUMENTS

| | | | | |
|---|---|---|---|---|
| 5,438,826 A * | 8/1995 | Blischke et al. | ................. | 60/276 |
| 6,230,487 B1 | 5/2001 | Blumenstock et al. | ......... | 60/286 |
| 6,256,983 B1 * | 7/2001 | Yasui | ............... | 60/285 |
| 6,594,988 B2 * | 7/2003 | Takubo et al. | ................. | 60/285 |
| 6,622,478 B2 | 9/2003 | Nakamura | ...................... | 60/285 |
| 6,959,539 B2 * | 11/2005 | Rosel et al. | ...................... | 60/276 |
| 7,117,665 B2 * | 10/2006 | Kamoto et al. | ................. | 60/277 |
| 8,020,369 B2 * | 9/2011 | Hahn | ............................. | 60/285 |
| 8,069,712 B2 * | 12/2011 | Frauhammer et al. | ..... | 73/114.75 |
| 2003/0017603 A1 | 1/2003 | Uchida et al. | .................... | 436/37 |
| 2003/0159434 A1 | 8/2003 | Ikemoto et al. | ................. | 60/285 |
| 2006/0032216 A1 | 2/2006 | Odendall | ........................ | 60/285 |

FOREIGN PATENT DOCUMENTS

| | | |
|---|---|---|
| DE | 19843859 A1 | 3/2000 |
| DE | 102004038481 B3 | 7/2005 |
| EP | 1433941 A2 | 6/2004 |

OTHER PUBLICATIONS

International PCT Search Report and Written Opinion, PCT/EP2009/054582, 11 pages.
German Office Action. German patent application No. 10 2008 025 676.5-13, 2 pages, Dec. 5, 2008.

* cited by examiner

*Primary Examiner* — Hai Huynh
(74) *Attorney, Agent, or Firm* — King & Spalding L.L.P.

(57) ABSTRACT

An internal combustion engine has an exhaust gas tract with a first and a second exhaust gas catalyst downstream of the first one, a first exhaust gas sensor, which is disposed upstream or in the first catalyst, and a second exhaust gas sensor, which is disposed downstream of the first catalyst and upstream of the second catalyst. During trailing throttle operation, the measurement signal of the second sensor is monitored for a signal characteristic that is typical of a maximum possible saturation state with oxygen that the first catalyst can achieve, upon which a characteristic variable is determined for a saturation state of the second catalyst with oxygen as a function of an engine operating variable. Outside the trailing throttle operation, an enrichment mode is controlled by enriching the air/fuel mixture, specifically as a function of the characteristic variable for the saturation state of the second catalyst with oxygen.

19 Claims, 2 Drawing Sheets

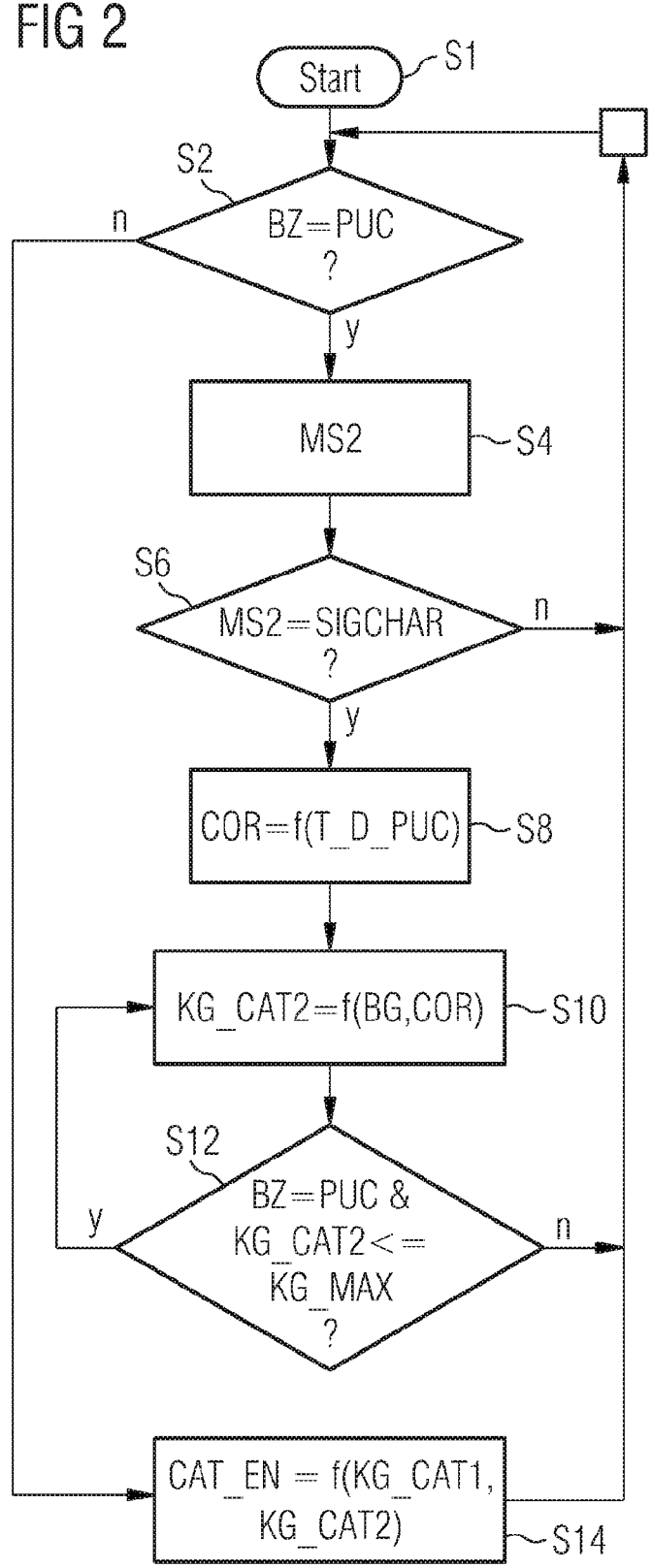

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2009/054582 filed Apr. 17, 2009, which designates the United States of America, and claims priority to German Application No. 10 2008 025 676.5 filed May 29, 2008, the contents of which are hereby incorporated by reference in their entirety.

TECHNICAL FIELD

The invention relates to a method and a device for operating an internal combustion engine comprising an exhaust gas tract. The exhaust gas tract comprises a first catalytic exhaust converter and a second catalytic exhaust converter disposed downstream of the first. It further comprises an exhaust gas sensor, which is disposed upstream of, or in, the first catalytic exhaust converter, and a second exhaust gas sensor, which is disposed downstream of the first catalytic exhaust converter and upstream of the second catalytic exhaust converter.

BACKGROUND

Increasingly strict statutory regulations regarding admissible pollutant emissions from motor vehicles, in which internal combustion engines are disposed, make it necessary to keep the pollutant emissions as low as possible during operation of the internal combustion engine. This may be done firstly by reducing the pollutant emissions that arise during combustion of the air-fuel mixture in the respective cylinder of the internal combustion engine. Secondly, in internal combustion engines exhaust gas after-treatment systems are used, by means of which the pollutant emissions produced during the process of combustion of the air-fuel mixture in the respective cylinders are converted into harmless substances. For this purpose for example catalytic exhaust converters are used, which convert carbon monoxide, hydrocarbons and nitrous oxides into harmless substances. In this connection for example so-called three-way catalytic converters are used.

SUMMARY

According to various embodiments, a method and a device for operating an internal combustion engine can be provided that enable easy and low-emission operation of the internal combustion engine.

According to an embodiment, in a method of operating an internal combustion engine comprising an exhaust gas tract, which comprises a first catalytic exhaust converter and a second catalytic exhaust converter disposed downstream of the first, a first exhaust gas sensor, which is disposed upstream of, or in, the first catalytic exhaust converter, and a second exhaust gas sensor, which is disposed downstream of the first catalytic exhaust converter and upstream of the second catalytic exhaust converter, during an overrun phase of the internal combustion engine: the measuring signal of the second exhaust gas sensor is monitored for a signal characteristic that is characteristic of attainment of a maximum degree of charging of the first catalytic exhaust converter with oxygen, wherein from occurrence of the signal characteristic onwards, a characteristic variable of a degree of charging of the second catalytic exhaust converter with oxygen is determined as a function of an operating variable of the internal combustion engine, while outside of the overrun phase an enrichment phase is controlled by enriching the air-fuel mixture supplied to the internal combustion engine, namely as a function of the characteristic variable of a degree of charging of the second catalytic exhaust converter with oxygen.

According to a further embodiment, a correction value can be determined as a function of a time distance of the overrun phase from a preceding overrun phase and the characteristic variable of the degree of charging of the second catalytic exhaust converter with oxygen is determined as a function of the correction value. According to a further embodiment, the characteristic variable of the degree of charging of the second catalytic exhaust converter may be limited to a selected maximum value.

A device for operating an internal combustion engine comprising an exhaust gas tract, which comprises a first catalytic exhaust converter and a second catalytic exhaust converter disposed downstream of the first, a first exhaust gas sensor, which is disposed upstream of, or in, the first catalytic exhaust converter, and a second exhaust gas sensor, which is disposed downstream of the first catalytic exhaust converter and upstream of the second catalytic exhaust converter, may be embodied, during an overrun phase of the internal combustion engine, to monitor the measuring signal of the second exhaust gas sensor for a signal characteristic that is characteristic of attainment of a maximum possible degree of charging of the first catalytic exhaust converter with oxygen, and from occurrence of the signal characteristic onwards, to determine a characteristic variable of a degree of charging of the second catalytic exhaust converter with oxygen as a function of an operating variable of the internal combustion engine, while outside of the overrun phase to control an enrichment phase by enriching the air-fuel mixture supplied to the internal combustion engine, namely as a function of the characteristic variable of a degree of charging of the second catalytic exhaust converter with oxygen.

BRIEF DESCRIPTION OF THE DRAWINGS

There will follow a detailed description of exemplary embodiments with reference to the schematic drawings. These show:

FIG. 2 a flowchart of a program.

In the figures, elements having an identical construction or function are denoted by the same reference numerals.

DETAILED DESCRIPTION

Figure 1:
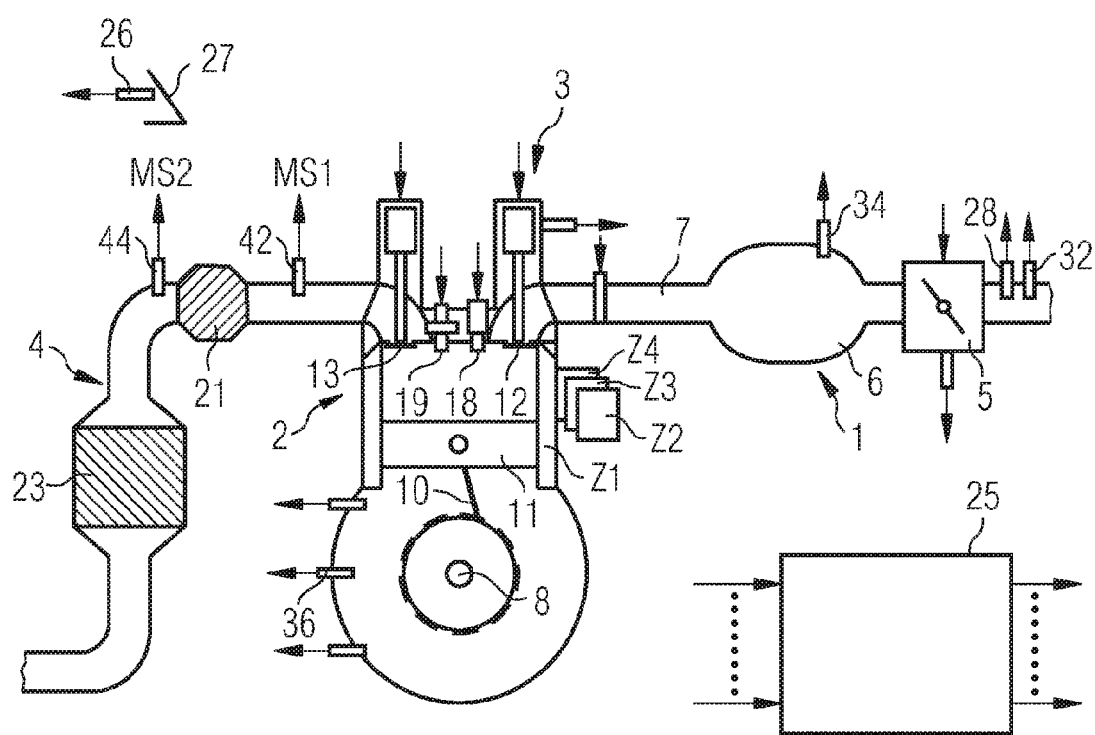
FIG. 1 an internal combustion engine with a control device.

According to various embodiments, in a method and a corresponding device for operating an internal combustion engine comprising an exhaust gas tract, which comprises a first catalytic exhaust converter and a second catalytic exhaust converter disposed downstream of the first, the exhaust gas tract further comprises a first exhaust gas sensor, which is disposed upstream of, or in, the first catalytic exhaust converter, and a second exhaust gas sensor, which is disposed downstream of the first catalytic exhaust converter and upstream of the second catalytic exhaust converter. During an overrun phase of the internal combustion engine the measuring signal of the second exhaust gas sensor is monitored for a signal characteristic that is characteristic of attainment of a maximum possible degree of charging of the first catalytic exhaust converter with oxygen. This signal characteristic may comprise for example, and depending on the embodiment of the exhaust gas sensor, the attainment of a selected value of the measuring signal, with which the so-called lean breakthrough of the first catalytic exhaust converter is associated. In this connection the signal characteristic may also comprise for example a gradient consideration.

During the overrun phase, from occurrence of the signal characteristic onwards a characteristic variable of a degree of charging of the second catalytic exhaust converter with oxygen is determined as a function of an operating variable of the internal combustion engine. Outside of the overrun phase an enrichment phase is controlled by enriching the air-fuel mixture supplied to the internal combustion engine, namely as a function of the characteristic variable of a degree of charging of the second catalytic exhaust converter with oxygen. By virtue of this determination of the characteristic variable of the degree of charging of the second catalytic exhaust converter, the degree of charging may be determined very easily but extremely precisely and hence the second catalytic exhaust converter outside of the overrun phase may be returned easily and precisely to a state, in which it may be operated within its preferred operating range. Thus, by means of the enrichment phase as a function of the characteristic variable of the degree of charging of the second catalytic exhaust converter, the so-called purge quantity may be metered very accurately in order to clear out the oxygen stored in the second catalytic exhaust converter from the overrun phase and do so in a suitable manner. It is thereby also possible to prevent hydrocarbons as a result of an overlong enrichment phase from then unnecessarily passing out of the exhaust gas tract of the internal combustion engine into the environment and generating undesirable pollutant emissions because of a second catalytic exhaust converter having already been purged of oxygen. It is moreover also possible thereby to reliably achieve the effect that by virtue of too low a purge quantity in the longer term superelevated NOX emissions arise. Furthermore, there is consequently no need to use additional sensors, on the contrary the measuring signal of the second exhaust gas sensor is cleverly evaluated in order in this way to detect the start of enriching of the second catalytic exhaust converter with oxygen during the overrun phase of the internal combustion engine and hence enable precise determination of the characteristic variable of the degree of charging of the second catalytic exhaust converter with oxygen.

According to an embodiment, a correction value is determined as a function of a time interval between the overrun phase and a preceding overrun phase and the characteristic variable of the degree of charging of the second catalytic exhaust converter with oxygen is determined as a function of the correction value. Thus, it may effectively be taken into account that any oxygen still stored as a result of the overrun phase preceding the actual overrun phase is taken into consideration.

According to a further embodiment, the characteristic variable of the degree of charging of the second catalytic exhaust converter is limited to a selected maximum value. This makes it easy to take into consideration the fact that the catalytic converter is capable of absorbing oxygen only to a specific extent and in particular the selected maximum value may be determined for example in advance, in particular on an engine test bed. For this purpose for example a third exhaust gas sensor may be used, by means of which a measuring signal may be detected if the second catalytic exhaust converter is fully charged with oxygen and is therefore no longer capable of absorbing any more oxygen. The maximum value thus determined may then be used for corresponding series internal combustion engines, which then do not have this third exhaust gas sensor. The third exhaust gas sensor may also be used to generate a discharge model between two successive overrun phases that may then be used in the context of determining the correction value.

In this connection, moreover, use is made of the knowledge that, in contrast to the first catalytic exhaust converter, the second catalytic exhaust converter is subject to markedly less ageing and hence in particular the oxygen storage capacity of the second catalytic exhaust converter during the relevant service life of the internal combustion engine does not vary to a considerable extent and hence by means of this maximum value an easy but sufficiently accurate estimation of the maximum charging of the second catalytic exhaust converter with oxygen may be effected.

An internal combustion engine (FIG. 1) comprises an intake tract 1, an engine block 2, a cylinder head 3 and an exhaust gas tract 4. The intake tract 1 preferably comprises a throttle valve 5, as well as a collector 6 and an intake manifold 7 that extends in the direction of a cylinder Z1 through an inlet channel into the engine block 2. The engine block 2 further comprises a crankshaft 8, which is coupled by a connecting rod 10 to the piston 11 of the cylinder Z1.

The cylinder head 3 comprises a valve operating mechanism having a gas inlet valve 12 and a gas outlet valve 13.

The cylinder head further comprises an injection valve 18 and a spark plug 19. Alternatively, the injection valve may be disposed in the intake manifold 7. In the exhaust gas tract 4 a first catalytic exhaust converter 21 and a second catalytic exhaust converter 23 are disposed, which are embodied for example as three-way catalytic converters. Typically, the first catalytic exhaust converter 21 is formed close to the engine and is therefore exposed to higher temperature variations than the second catalytic exhaust converter 23, which as a rule is disposed markedly further from the engine block 2 than the first catalytic exhaust converter 21 and is therefore exposed to markedly lower temperature variations. The first catalytic exhaust converter 21, in terms of its catalytic converter volume, is embodied markedly smaller than the second catalytic exhaust converter 23 for example. Its catalytic converter volume may however in principle be in any desired ratio to that of the second catalytic exhaust converter 23.

Often the first catalytic exhaust converter 21 is also referred to as the preliminary catalytic converter and the second catalytic exhaust converter 23 as the main catalytic converter.

A control device 25 is further provided, with which are associated sensors that acquire various measured variables and determine in each case the value of the measured variable. Operating variables BG comprise, in addition to the measured variables, also variables derived therefrom.

The control device 25 is embodied to determine as a function of at least one of the operating variables BG manipulated variables that are then converted into one or more actuating signals for controlling the final control elements by means of corresponding operators. The control device 25 may also be described as a device for operating the internal combustion engine.

The sensors are a pedal position sensor 26 that detects an accelerator pedal position of an accelerator pedal 27, an air-mass sensor 28 that acquires an air-mass flow upstream of the throttle valve 5, a first temperature sensor 32 that acquires an intake air temperature, an intake manifold pressure sensor 34 that acquires an intake manifold pressure in the collector 6, a crankshaft angle sensor 36 that acquires a crankshaft angle, with which a rotational speed is then associated.

A first exhaust gas sensor 42 is further provided, which is disposed upstream of the first catalytic exhaust converter 21 or in the first catalytic exhaust converter 21 and acquires a residual oxygen content of the exhaust gas and the measuring signal MS1 of which is characteristic of the air-fuel ratio in the combustion chamber of the cylinder Z1 and upstream of the first exhaust gas sensor 42 prior to oxidation of the fuel, hereinafter referred to as the air-fuel ratio in the cylinder Z1. The first exhaust gas sensor 42 may also be disposed in such a way in the first catalytic exhaust converter 21 that part of the catalytic converter volume is situated upstream of the first exhaust gas sensor 42. The first exhaust gas sensor 42 may be for example a linear lambda sensor or alternatively a binary lambda sensor.

In a preferred manner there may be further disposed downstream of the first catalytic exhaust converter 21 a second exhaust gas sensor 44, which is used in particular also in the context of a trim control operation and in a preferred manner may be embodied as a simple binary lambda sensor. It may however alternatively be embodied for example as a linear lambda sensor.

Depending on an embodiment any desired subset of the described sensors or also additional sensors may be provided.

The final control elements are for example the throttle valve 5, the gas inlet- and gas outlet valves 12, 13, the injection valve 18 or the spark plug 19.

Besides the cylinder Z1, further cylinders Z2 to Z4 may be preferably additionally provided, with which corresponding final control elements and optionally sensors are then also associated. In principle, therefore, the internal combustion engine may have any desired number of cylinders.

A program for operating the internal combustion engine is started in a step S1 (FIG. 2). In the step S1 optionally variables may be initialized.

In a step S2 it is checked whether an operating state BZ of the internal combustion engine is identical to the overrun phase PUC. If this is the case, then in a step S4 the measuring signal MS2 of the second exhaust gas sensor 44 is acquired. In a step S6 it is then checked whether the measuring signal MS2 of the second exhaust gas sensor 44 has a signal characteristic that is characteristic of attainment of a maximum possible degree of charging of the second catalytic exhaust converter 23 with oxygen. The signal characteristic may comprise for example attainment of a selected characteristic value of the measuring signal MS2 of the second exhaust gas sensor, namely in particular for example in connection with a selected gradient or at least a selected sign of the gradient. In this case use is made of the knowledge that the first catalytic exhaust converter 21, if it has reached its full charge of oxygen, is no longer capable of absorbing oxygen and so a much higher oxygen fraction during the overrun phase PUC then reaches the second exhaust gas sensor 44 and hence also the second catalytic exhaust converter 23. The occurrence of the signal characteristic therefore correlates with the time, from which charging of the oxygen store of the second catalytic exhaust converter 23 begins during the overrun phase PUC. If the condition of the step S6 is not met, processing is continued afresh in the step S2, optionally after a selectable waiting time has elapsed.

If on the other hand the condition of the step S6 is met, then in a step S8 a correction value COR is determined as a function of a time distance T_D_PUC of the overrun phase PUC from a preceding overrun phase. The time distance T_D_PUC is therefore representative of the interval between two successive overrun phases. Determination of the correction value may be effected for example using a characteristics map that has been determined in advance for example by means of tests on an engine test bed or alternatively by simulation.

In a step S10 the characteristic variable KG_CAT2 of a degree of charging of the second catalytic exhaust converter 23 with oxygen is determined. This is effected as a function of at least one operating variable BG. In a preferred manner this may be effected for example by means of integrating the air-mass flow, which is acquired by means of the air-mass sensor 28, over time. In this respect, in a preferred manner a so-called oxygen integral can be generated as a characteristic variable KG_CAT2 of the degree of charging of the second catalytic exhaust converter 23 with oxygen. The characteristic variable KG_CAT2 may however in principle be determined also as a function of further operating variables. Furthermore, the characteristic variable KG_CAT2 of the degree of charging of the second catalytic exhaust converter 23 with oxygen can be determined in a preferred manner also as a function of the correction value. This effectively allows any oxygen that is still stored from the preceding overrun phase to be taken into consideration.

In a step S12 it is then checked whether the operating state BZ is identical to the overrun phase PUC and the value of the characteristic variable KG_CAT2 is lower than or equal to a selected maximum value KG_MAX.

The selected maximum value KG_MAX can be preferably determined in advance by means of corresponding tests for example on an engine test bed or alternatively by means of simulations. In this connection it is particularly advantageous if for this purpose for example on a test internal combustion engine, in particular on an engine test bed, a third exhaust gas sensor 23 is also provided downstream of the second catalytic exhaust converter 23, by means of which the maximum value KG_MAX may be determined, namely in particular also by means of a further signal characteristic of the third exhaust gas sensor that is characteristic of attainment of a maximum degree of charging of the second catalytic exhaust converter 23 with oxygen.

If the condition of the step S12 is not met, then processing is continued afresh in the step S2. If on the other hand the condition of the step S12 is met, then processing is continued afresh in the step S10. In this connection, the continuation of the processing may occur for example likewise only after a selectable waiting time has elapsed.

If the condition of the step S2 is not met, i.e. the operating state BZ is not the overrun phase PUC, then in a step S14 an enrichment phase CAT_EN is controlled, namely as a function of the characteristic variable KG_CAT2 of the degree of charging of the second catalytic exhaust converter 23 with oxygen and preferably as a function of a characteristic variable KG_CAT1 of a degree of charging of the first catalytic exhaust converter 21 with oxygen. The characteristic variable KG_CAT1 relating to the first catalytic exhaust converter 21 can be preferably determined for example also by means of an oxygen integral, wherein for this purpose the measuring signals MS1 and/or MS2 of the first and/or second exhaust gas sensor 42, 44 may be evaluated and in principle for example a further operating variable may also be used, such as for example the air-mass flow. In this case, the enrichment phase CAT_EN is controlled in such a way that on completion of the overrun phase PUC, while optionally simultaneously taking further boundary conditions into consideration, the respective catalytic exhaust converter 21, 23 is operated in particular as rapidly as possible once again within its preferred conversion window. Once this is achieved, no further enrichment phase is required.

During the enrichment phase CAT_EN a purposeful enrichment of the supplied air-fuel mixture occurs in order to achieve the effect that hydrocarbons may react in one of the catalytic exhaust converters 21, 23 with oxygen that is bound there and so the respective degree of charging is suitably reduced.

Following the step S14, processing is continued afresh in step S2.

The invention claimed is:

1. A method of operating an internal combustion engine comprising an exhaust gas tract, which has a first catalytic exhaust converter and a second catalytic exhaust converter disposed downstream of the first, a first exhaust gas sensor, which is disposed upstream of, or in, the first catalytic exhaust converter, and a second exhaust gas sensor, which is disposed downstream of the first catalytic exhaust converter and upstream of the second catalytic exhaust converter, the method comprising:
during an overrun phase of the internal combustion engine:
monitoring the measuring signal of the second exhaust gas sensor;
based on the monitored measuring signal of the second exhaust gas sensor, identifying a signal characteristic that indicates a maximum degree of charging of the first catalytic exhaust converter with oxygen, and
in response to the identification of the signal characteristic indicating a maximum degree of charging of the first catalytic exhaust converter with oxygen, determining a characteristic variable of a degree of charging of the second catalytic exhaust converter with oxygen as a function of an operating variable of the internal combustion engine, and
outside of the overrun phase, controlling an enrichment phase by enriching an air-fuel mixture supplied to the internal combustion engine as a function of the characteristic variable of the degree of charging of the second catalytic exhaust converter with oxygen determined during the overrun phase.

2. The method according to claim 1, wherein a correction value is determined as a function of a time distance of the overrun phase from a preceding overrun phase and the characteristic variable of the degree of charging of the second catalytic exhaust converter with oxygen is determined as a function of the correction value.

3. The method according to claim 1, wherein the characteristic variable of the degree of charging of the second catalytic exhaust converter is limited to a selected maximum value.

4. A device for operating an internal combustion engine comprising an exhaust gas tract with a first catalytic exhaust converter and a second catalytic exhaust converter disposed downstream of the first, a first exhaust gas sensor, which is disposed upstream of, or in, the first catalytic exhaust converter, and a second exhaust gas sensor, which is disposed downstream of the first catalytic exhaust converter and upstream of the second catalytic exhaust converter, wherein the device is operable
during an overrun phase of the internal combustion engine:
to monitor the measuring signal of the second exhaust gas sensor;
based on the monitored measuring signal of the second exhaust gas sensor, identifying a signal characteristic that indicates a maximum possible degree of charging of the first catalytic exhaust converter with oxygen, and
to determine, in response to the identification of the signal characteristic indicating a maximum degree of charging of the first catalytic exhaust converter with oxygen, a characteristic variable of a degree of charging of the second catalytic exhaust converter with oxygen as a function of an operating variable of the internal combustion engine, and
outside of the overrun phase, to control an enrichment phase by enriching an air-fuel mixture supplied to the internal combustion engine as a function of the characteristic variable of the degree of charging of the second catalytic exhaust converter with oxygen determined during the overrun phase.

5. The device according to claim 4, further being operable to determine a correction value as a function of a time distance of the overrun phase from a preceding overrun phase and the characteristic variable of the degree of charging of the second catalytic exhaust converter with oxygen is determined as a function of the correction value.

6. The device according to claim 4, wherein the characteristic variable of the degree of charging of the second catalytic exhaust converter is limited to a selected maximum value.

7. An internal combustion engine, comprising
an intake tract,
an engine block,
a cylinder head, and an exhaust gas tract,
wherein in the exhaust gas tract a first catalytic exhaust converter and a second catalytic exhaust converter are disposed,
a first exhaust gas sensor, which is disposed upstream of the first catalytic exhaust converter or in the first catalytic exhaust converter,
a second exhaust gas sensor disposed downstream of the first catalytic exhaust converter, and
a control device with which are associated sensors that acquire various measured variables and determine in each case the value of the measured variable,
wherein the control device is operable:
during an overrun phase of the internal combustion engine:
to monitor the measuring signal of the second exhaust gas sensor;
based on the monitored measuring signal of the second exhaust gas sensor, identifying a signal characteristic that indicates a maximum possible degree of charging of the first catalytic exhaust converter with oxygen, and
to determine, in response to the identification of the signal characteristic indicating a maximum degree of charging of the first catalytic exhaust converter with oxygen, a characteristic variable of a degree of charging of the second catalytic exhaust converter with oxygen as a function of an operating variable of the internal combustion engine, and
outside of the overrun phase, to control an enrichment phase by enriching an air-fuel mixture supplied to the internal combustion engine as a function of the characteristic variable of the degree of charging of the second catalytic exhaust converter with oxygen determined during the overrun phase.

8. The internal combustion engine according to claim 7, wherein the intake tract comprises a throttle valve, a collector and an intake manifold that extends in the direction of a cylinder through an inlet channel into the engine block.

9. The internal combustion engine according to claim 7, wherein the engine block further comprises a crankshaft, which is coupled by a connecting rod to the piston of the cylinder.

10. The internal combustion engine according to claim 7, wherein the cylinder head comprises a valve operating mechanism having a gas inlet valve and a gas outlet valve.

11. The internal combustion engine according to claim 10, wherein the cylinder head further comprises an injection valve and a spark plug.

12. The internal combustion engine according to claim 10, wherein the injection valve is disposed in the intake manifold.

13. The internal combustion engine according to claim 7, wherein at least one of the first and second catalytic converter is embodied as a three-way catalytic converter.

14. The internal combustion engine according to claim 7, wherein the first catalytic exhaust converter is formed close to the engine and is therefore exposed to higher temperature variations than the second catalytic exhaust converter, which is disposed further from the engine block than the first catalytic exhaust converter 21 and is therefore exposed to markedly lower temperature variations.

15. The internal combustion engine according to claim 7, wherein the first catalytic exhaust converter, in terms of its catalytic converter volume, is embodied smaller than the second catalytic exhaust converter.

16. The internal combustion engine according to claim 7, wherein the sensors are a pedal position sensor that detects an accelerator pedal position of an accelerator pedal, an air-mass sensor that acquires an air-mass flow upstream of the throttle valve, a first temperature sensor that acquires an intake air temperature, an intake manifold pressure sensor that acquires an intake manifold pressure in the collector, a crankshaft angle sensor that acquires a crankshaft angle, with which a rotational speed is then associated.

17. The internal combustion engine according to claim 7, wherein the first gas sensor acquires a residual oxygen content of the exhaust gas and a measuring signal of which is characteristic of the air-fuel ratio in the combustion chamber of a cylinder.

18. The internal combustion engine according to claim 7, wherein the first exhaust gas sensor is disposed in such a way in the first catalytic exhaust converter that part of the catalytic converter volume is situated upstream of the first exhaust gas sensor.

19. The internal combustion engine according to claim 7, wherein the device is program controlled.

* * * * *